Patented Jan. 18, 1927.

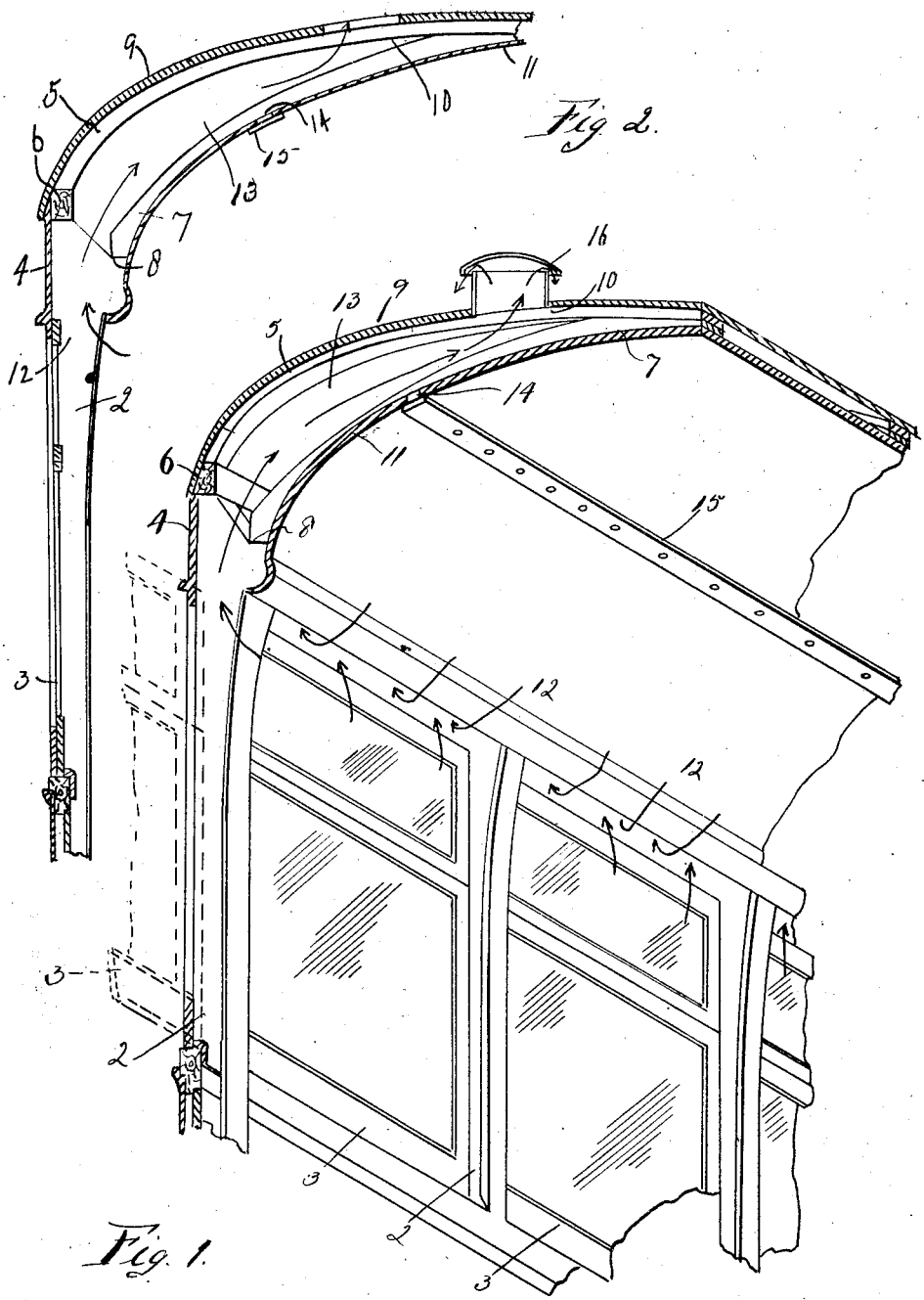

1,615,164

UNITED STATES PATENT OFFICE.

JOSEPH S. BROWN, OF PHILADELPHIA, PENNSYLVANIA.

CAR VENTILATOR.

Application filed March 31, 1923. Serial No. 629,090.

My invention relates to new and useful improvements in a car ventilator, and has for its primary object to provide means for evacuating air from the occupant chamber prior to exhausting it into the outside air or atmosphere.

Another object of the invention is to utilize the space between the car roof and ceiling as an intermediate compartment to receive air from the occupant chamber from which place it may pass into the atmosphere in a number of slow streams thereby eliminating, to a large degree, the likelihood of any draughts which might affect the persons in the occupant chamber.

A further object of the invention is to provide a number of large openings leading from the occupant chamber to the intermediate compartment preferably at a point some distance below the highest part of the arched ceiling and to provide means for evacuating the air in the bow of the arch above the main openings between the occupant chamber and the intermediate compartment.

A still further object of the invention is to provide a spaced car roof and ceiling forming a compartment having outlets communicating with the exterior of the car the lower portions or edges of the ceiling being spaced from the side walls of the car, preferably in the region of the windows, to form communicating passageways between the occupant chamber and the compartment intermediate the roof and ceiling.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawing forming a part of this application, in which:—

Fig. 1 is a fragmentary sectional perspective view of a car illustrating an embodiment of my invention.

Fig. 2 is a fragmentary vertical sectional view in the region of one of the windows.

In carrying out my invention as here embodied, 2 represents a number of spaced uprights generally arranged at distances equal to the width of the windows designated by the numeral 3, a portion of one of which is shown in dotted lines in Fig. 1.

To these uprights are secured the side walls or outer skin 4 of the car and said uprights support the roof beams 5, with a longitudinal joist 6 between them if desired, as well as the ceiling beams 7 which preferably rest upon the shoulder 8.

On the outside of the roof beams 5 is mounted the roof 9 having a hole or holes 10 therethrough at suitable points for a purpose to be hereinafter described while on the ceiling beams 7, preferably the undersides thereof, is secured a ceiling 11 the lower edges of which are spaced from the side walls of the car so as to form openings 12 providing communication between the occupant chamber of the car and an intermediate compartment 13 produced between the ceiling and roof due to the spacing thereof. The communication openings between the occupant chamber and the intermediate compartment are preferably located below the highest part of the arched ceiling and in the region of the upper portions of the windows so that the air passing from the occupant chamber will flow in small streams toward said openings without the likelihood of forming a strong draught and without interfering with the persons in the occupant chamber so that no discomfiture will result from such evacuation of the air.

In a car structure where the ceiling is of arched shape as herein illustrated it is likely that a certain amount of air might become pocketed in the bow of the arched ceiling and in order to reduce this possibility and get rid of the contaminated air in the arch of a ceiling I prefer to provide the ceiling with one or more apertures 14 at a point or points between the openings 12 and the highest portion of the arched ceiling so as to form further communication between the occupant chamber and the intermediate compartment 13 and if found desirable the aperture or apertures thus provided may be covered with foraminous or perforated means 15, such as for instance, perforated strips of molding.

The openings 10 through the roof which form exhaust ports from the intermediate compartment 13 to the exterior of the car are preferably covered or fitted with suitable ventilating caps or cowls 16 which prevent any currents of air from blowing directly into the intermediate compartment 13 and at the same time acting to induce a suction as to assist in exhausting the air which has entered the compartment 13 from the occupant chamber.

In practice any air which enters the occupant chamber may circulate within the same and as it rises will pass through the openings 12 as shown by the arrows and enter the intermediate compartment 13 where it may again circulate and finally exhaust through the ventilator caps 16 in slow small streams due to the fact that the exhaust openings are of smaller capacity or area than that of the intermediate compartment 13 and therefore no perceptible draught will be produced within the occupant chamber.

Of course I do not wish to be limited to the exact details of construction as herein shown as these may be varied within the limits of the appended claim without departing from the spirit of my invention.

Having thus fully described my invention, what I claim as new and useful is:—

A car ventilator comprising, in combination, a car including an arched roof and ceiling spaced therefrom with that portion adjacent the edges thereof rolled inwardly and its edges extending outwardly beyond the intersection of the rolled and arched portion of the ceiling, to provide an intermediate compartment in communication with the interior of the car by restricted openings formed between the edges of the ceiling and side walls of the car adjacent the tops of the windows, and exhaust means communicating with said intermediate compartment.

In testimony whereof, I have hereunto affixed my signature.

JOSEPH S. BROWN.